United States Patent
Nakagawa

(10) Patent No.: US 9,618,117 B2
(45) Date of Patent: Apr. 11, 2017

(54) OIL SEAL

(71) Applicant: NOK CORPORATION, Tokyo (JP)

(72) Inventor: Takehiro Nakagawa, Fukushima (JP)

(73) Assignee: NOK Corporation (JP)

( * ) Notice: Subject to any disclaimer, the term of this patent is extended or adjusted under 35 U.S.C. 154(b) by 21 days.

(21) Appl. No.: 14/437,437

(22) PCT Filed: Sep. 4, 2013

(86) PCT No.: PCT/JP2013/073748
§ 371 (c)(1),
(2) Date: Apr. 21, 2015

(87) PCT Pub. No.: WO2014/065013
PCT Pub. Date: May 1, 2014

(65) Prior Publication Data
US 2015/0276059 A1    Oct. 1, 2015

(30) Foreign Application Priority Data

Oct. 23, 2012   (JP) .................................. 2012-233636

(51) Int. Cl.
*F16J 15/32*   (2016.01)
*F16C 33/78*   (2006.01)
(Continued)

(52) U.S. Cl.
CPC ......... *F16J 15/002* (2013.01); *F16C 33/7823* (2013.01); *F16J 15/164* (2013.01);
(Continued)

(58) Field of Classification Search
CPC .. F16C 33/78; F16C 33/7876; F16C 33/7879; F16C 33/7883; F16C 33/80;
(Continued)

(56) References Cited

U.S. PATENT DOCUMENTS 3,682,488 A * 8/1972 Matsushima ........ F16J 15/3256
277/551
4,974,860 A * 12/1990 Anzue .................... F16J 15/164
277/351

(Continued)

FOREIGN PATENT DOCUMENTS

CN          1934379 A      3/2007
CN      101080590 A     11/2007
(Continued)

OTHER PUBLICATIONS

Machine Translation of JPH08254213.*

*Primary Examiner* — Nicholas L Foster
(74) *Attorney, Agent, or Firm* — Harness, Dickey & Pierce, P.L.C.

(57) ABSTRACT

An oil seal has a lip seal member, a slinger and a dust cover. The slinger has a thread groove carrying out a pumping action toward a diametrically outer side. The dust cover achieves a dust shake-off action by a centrifugal force at the shaft rotating time, and a labyrinth seal action by forming a micro gap in relation to the lip seal member. The lip seal member has a main lip and a dust lip. The elastic dust lip has a first bellows portion receiving an atmospheric pressure by an inner surface and receiving an internal pressure between the lips by an outer surface, a second bellows portion receiving the atmospheric pressure by an outer surface and receiving the internal pressure between the lips by an inner surface, and a lip end. A pressure receiving area of the first bellows portion is greater than the second bellows portion.

2 Claims, 5 Drawing Sheets

(51) Int. Cl.
  *F16J 15/00* (2006.01)
  *F16J 15/16* (2006.01)
  *F16J 15/3256* (2016.01)
  *F16J 15/447* (2006.01)
  *F16J 15/3244* (2016.01)
  *F16J 15/3232* (2016.01)
  *F16J 15/34* (2006.01)

(52) U.S. Cl.
  CPC ....... *F16J 15/3232* (2013.01); *F16J 15/3244* (2013.01); *F16J 15/3256* (2013.01); *F16J 15/447* (2013.01); *F16J 15/3456* (2013.01)

(58) Field of Classification Search
  CPC ... F16C 33/805; F16C 33/7823; F16J 15/326; F16J 15/3256; F16J 15/3264; F16J 15/3232; F16J 15/3244; F16J 15/3268
  See application file for complete search history.

(56) References Cited

U.S. PATENT DOCUMENTS

| | | | | |
|---|---|---|---|---|
| 5,201,528 A | * | 4/1993 | Upper | F16J 15/3256 277/394 |
| 2003/0001341 A1 | * | 1/2003 | Sakata | F16C 19/49 277/423 |
| 2005/0184469 A1 | * | 8/2005 | Ishii | F16J 15/3264 277/562 |
| 2005/0250586 A1 | | 11/2005 | Yamada et al. | |
| 2007/0187901 A1 | * | 8/2007 | Matsui | F16J 15/326 277/551 |
| 2008/0029967 A1 | * | 2/2008 | Nakagawa | F16J 15/164 277/349 |
| 2011/0006485 A1 | * | 1/2011 | Nakagawa | F16J 15/164 277/549 |
| 2011/0069917 A1 | * | 3/2011 | Yamada | B65G 39/09 384/470 |
| 2015/0285380 A1 | * | 10/2015 | Nakagawa | F16J 15/164 277/351 |

FOREIGN PATENT DOCUMENTS

| | | |
|---|---|---|
| CN | 101379326 A | 3/2009 |
| CN | 101617154 A | 12/2009 |
| CN | 201412512 Y | 2/2010 |
| CN | 101932859 A | 12/2010 |
| JP | H04-027262 U | 3/1992 |
| JP | H07-208610 A | 8/1995 |
| JP | H08-254213 A | 10/1996 |
| JP | H08254213 * | 10/1996 |
| JP | H08-303604 A | 11/1996 |
| JP | H09-42300 A | 2/1997 |
| JP | H10-115375 A | 5/1998 |
| JP | 2003-287142 A | 10/2003 |

\* cited by examiner

OIL SEAL

CROSS-REFERENCE TO RELATED APPLICATIONS

This application is a 371 U.S. National Stage Application of International Application No. PCT/JP2013/073748, filed on Sep. 4, 2013, and published in Japanese as WO 2014/065013 A1 on May 1, 2014. This application claims priority to Japanese Application No. 2012-233636, filed on Oct. 23, 2012. The entire disclosures of the above applications are incorporated herein by reference.

BACKGROUND OF THE INVENTION

Field of the Invention

The present invention relates to an oil seal which is one kind of a sealing device according to a seal technology. The oil seal according to the present invention is used, for example, an automobile (engine) relevant field, or is used in a general industrial machinery field.

Description of the Conventional Art

An oil seal using a fabric 51 as a dust lip has been conventionally known as shown in FIG. 5, and the oil seal is used, for example, for sealing around a crank shaft in a field of an automobile engine (a diesel engine).

In this prior art, an initial inner diameter (an inner diameter before insertion of a slinger 52) d1 of the fabric 51 is set to be smaller than an outer diameter d2 of a fabric sliding portion in the slinger 52, whereby the fabric 51 has a fastening margin. The fabric 51 is structured such that the fabric 51 is expanded along the slinger 52 when the slinger 52 is inserted, thereby securing a contact width with the slinger 52.

Therefore, since the fastening margin of the fabric 51 is set great so that the fabric 51 can be uniformly expanded circumferentially, and since an elongation load of the fabric 51 itself is high and a tense force becomes high, a sliding torque of the fabric is high, thereby preventing an improvement of fuel efficiency.

Further, since the fabric 51 has a breathability, the fabric 51 has the following advantages and disadvantages.

Advantages

In the case of generation of such a condition that a pressure in a space 54 between the fabric 51 and a main lip 53 is lowered, the fabric 51 intakes (passes) an air (an atmospheric air) in an external side B and the reduction of the pressure is suppressed. Therefore, it is possible to inhibit the pressure in the space 54 between the fabric 51 and the main lip 53 from being lowered and inhibit the main lip 53 from coming into entire contact with the slinger 52 (an advantage on the basis of the air intake of the fabric).

Disadvantages

An air leak inspection may be carried out at the shipping time of the oil seal, and the inspection is generally carried out by applying a positive pressure from a machine inner side and measuring an amount of air leakage in the fabric 51 side. In this case, since the fabric 51 discharges (passes) the air in the prior art, the amount of leakage does not come to zero even in the case that the oil seal is normal. Therefore, it is necessary to carry out the inspection in a state in which a leakage allowable value is set, and it is impossible to carry out a simple inspection in which a leakage threshold value is set to zero (a disadvantage caused by the air discharge of the fabric).

SUMMARY OF THE INVENTION

Problem to be Solved by the Invention

The present invention is made by taking the above points into consideration, and an object of the present invention is to provide an oil seal which can reduce a sliding torque in comparison with a case that a fabric is used as a dust lip, can achieve the same effect as the advantage caused by the air intake of the fabric without using any fabric, and can dissolve the disadvantage caused by the air discharge of the fabric.

Means for Solving the Problem

In order to achieve the object mentioned above, an oil seal according to a first aspect of the present invention is an oil seal constructed by a combination of a lip seal member which is fixed to an inner periphery of a shaft hole of a housing and a slinger which is fixed to a rotary shaft inserted to the shaft hole, and inhibiting a dust in an external side from entering into a machine inner side as well as inhibiting a sealed fluid in the machine inner side from leaking to the external side, the oil seal comprising:

a dust cover together with the lip seal member and the slinger, wherein the slinger is integrally provided with a tubular portion which is fitted to the rotary shaft and a flange portion which is formed so as to rise up toward an outer side in a diametrical direction from the tubular portion, and is provided with a thread groove which carries out a pumping action toward an outer side in a diametrical direction in an end surface in an external side of the flange portion, the dust cover is integrally provided with a cylinder portion which is fitted to the tubular portion of the slinger and a diametrical portion which is formed so as to rise up toward an outer side in a diametrical direction from the cylinder portion, the diametrical portion is provided with a structure which achieves a dust shake-off action on the basis of a centrifugal force at the shaft rotating time, and a labyrinth seal action by forming a micro gap in relation to the lip seal member, the lip seal member is provided with a main lip which slidably comes into close contact with the end surface in the external side of the flange portion in the slinger so as to seal the sealed fluid, and a dust lip which slidably comes into close contact with an outer peripheral surface of the tubular portion in the slinger so as to suppress intrusion of the dust as well as being arranged between the main lip and the dust cover, the dust lip is constructed by a rubber-like elastic body and is integrally provided with a first bellows portion which receives an internal pressure between the dust lip and the main lip by an outer peripheral surface as well as receiving an atmospheric air pressure in the external side by an inner peripheral surface, a second bellows portion which receives the internal pressure between the dust lip and the main lip by an inner peripheral surface as well as receiving the atmospheric air pressure in the external side by an outer peripheral surface, and a lip end which slidably comes into close contact with an outer peripheral surface of the tubular portion in the slinger, and a pressure receiving area is set to be greater in the first bellows portion than in the second bellows portion.

Further, an oil seal according to a second aspect of the present invention is the oil seal described in the first aspect mentioned above, wherein the dust lip is provided in the inner peripheral surface of the second bellows portion with a circumferentially partial projection which comes into contact with the outer peripheral surface of the tubular portion in the slinger, and is provided with a structure in which the projection is interposed between the outer peripheral surface of the tubular portion in the slinger and the inner peripheral surface of the second bellows portion, thereby reducing a contact surface pressure of the lip end of the dust lip in relation to the outer peripheral surface of the tubular portion in the slinger.

In the oil seal according to the present invention having the structure mentioned above, the dust lip is constructed by the rubber-like elastic body in place of the fabric, and the dust lip constructed by the rubber-like elastic body can be formed thin and tends to elastically deform. As a result, the tense force can be reduced in spite of the same fastening margin as that of the fabric. Further, since the dust lip is provided with the first bellows portion, the second bellows portion and the lip end and is formed into the bellows shape which tends to elastically deform in the diametrical direction as a whole, the tense force can be widely reduced. Therefore, it is possible to reduce the sliding torque of the dust lip because of the above matters.

Further, in the present invention, the same effect as the advantage on the basis of the air intake of the fabric can be achieved as follows.

More specifically, in the present invention, since the thread groove carrying out the pumping action toward the outer side in the diametrical direction is provided in the end surface in the external side of the flange portion in the slinger, an excellent seal effect can be achieved in relation to the sealed fluid in the machine inner side. However, in the case that the thread groove is provided, the pressure (the internal pressure) in the space between the main lip and the dust lip tends to be lowered and the negative pressure tends to be generated in connection with the pumping action of the thread groove at the shaft rotating time, so that the main lip tends to come into entire contact with the slinger.

In relation to this, since the dust lip is provided with the first bellows portion, the second bellows portion and the lip end as mentioned above so as to be formed into the bellows shape which tends to elastically deform in the diametrical direction as a whole, and is structured such that the pressure receiving area is set to be larger in the first bellows portion than in the second bellows portion, the atmospheric air pressure becomes relatively higher under the reduction of the pressure in the space between the main lip and the dust lip, the dust lip elastically deforms toward the outer side in the diametrical direction on the basis of the pressure difference (this corresponds to an image that the bellows-like dust lip contracts toward the outer side in the diametrical direction), and the lip end moves away (floats up) from the outer peripheral surface of the tubular portion in the slinger. Therefore, since a clearance is tentatively formed between the lip end and the tubular portion, and the air (the atmospheric air pressure) in the external side flows into the space between the main lip and the dust lip via the clearance, it is possible to suppress an extreme reduction of the pressure in the space between the main lip and the dust lip and a generation of the negative pressure.

Further, in the present invention, the disadvantage caused by the air discharge of the fabric can be dissolved as follows.

More specifically, in the present invention, since the thread groove carrying out the pumping action toward the outer side in the diametrical direction is provided in the end surface in the external side of the flange portion in the slinger as mentioned above, an excellent seal effect is applied to the sealed fluid in the machine. However, since an air flow passage is formed through the thread groove in the case that the thread groove is provided, the air flowing through the air flow passage is sensed as the leakage in the case that the air leak inspection is carried out at the oil seal shipping time.

In relation to this, since the dust lip is provided with the first bellows portion, the second bellows portion and the lip end as mentioned above so as to be formed into the bellows shape which tends to elastically deform in the diametrical direction as a whole, and is structured such that the pressure receiving area is set to be larger in the first bellows portion than in the second bellows portion, the atmospheric air pressure becomes relatively lower under the rising of the pressure in the space between the main lip and the dust lip, the dust lip elastically deforms toward the inner side in the diametrical direction on the basis of the pressure difference (this corresponds to an image that the bellows-like dust lip expands toward the inner side in the diametrical direction), and the lip end is pressed to the outer peripheral surface of the tubular portion in the slinger and is hard to move away from the tubular portion (hard to float up). Therefore, since the dust lip seals the pressure (the air flow) in the space between the main lip and the dust lip, the air leakage is not sensed in the dust lip side in the case that the oil seal is normal. As a result, it is possible to carry out a simple inspection in which the threshold value of the air leakage is set to zero.

Further, an original function of the dust lip is to inhibit the dust in the external side from entering into the machine, however, the dust is sealed as follows in the present invention.

More specifically, in the present invention, the dust cover is provided together with the lip seal member and the slinger. The dust cover is integrally provided with the cylinder portion which if fitted to the tubular portion of the slinger and the diametrical portion which is formed so as to rise up toward the outer side in the diametrical direction form the cylinder portion, and the diametrical portion achieves the dust shake-off action on the basis of the centrifugal force at the shaft rotating time and the labyrinth seal action caused by forming the micro gap in relation to the lip seal member. Therefore, it is possible to seal the dust on the basis of these actions. Further, the dust lip is in a state in which the lip end is in contact with the outer peripheral surface of the tubular portion in the slinger, at the stationary time. Therefore, it is possible to seal the dust on the basis of the seal action of the dust lip.

Further, with regard to the dust lip, it can be thought that the circumferentially partial projection coming into contact with the outer peripheral surface of the tubular portion in the slinger is provided in the inner peripheral surface of the second bellows portion. In this case, since the projection is interposed between the outer peripheral surface of the tubular portion in the slinger and the inner peripheral surface of the second bellows, the contact surface pressure of the lip end of the dust lip can be reduced in relation to the outer peripheral surface of the tubular portion in the slinger. Therefore, under a condition that the pressure in the space between the main lip and the dust lip is lowered as mentioned above, the lip end further tends to move away (further tends to float up) from the outer peripheral surface of the tubular portion in the slinger. As a result, the air (the atmospheric air pressure) in the external side tends to flow in. Since the projection is provided in a part of the circumference, the inflow of the air is not prevented.

Effect of the Invention

The present invention achieves the following effects.

More specifically, in the present invention, the dust lip is constructed by the rubber-like elastic body which can be formed thin and tends to elastically deform in place of the fabric as described above, and is provided with the first bellows portion, the second bellows portion and the lip end so as to be formed into the bellows shape which tends to elastically deform in the diametrical direction as a whole. As a result, it is possible to reduce the sliding torque of the dust lip.

Further, under the condition that the pressure in the space between the main lip and the dust lip is lowered, the bellows-like dust lip acts in the direction of moving away from the outer peripheral surface of the tubular portion in the slinger on the basis of the pressure difference so as to introduce the air (the atmospheric air pressure) in the external side. As a result, it is possible to suppress the extreme reduction of the pressure in the space between the main lip and the dust lip and the generation of the negative pressure, whereby it is possible to suppress the entire contact of the main lip with the slinger.

Further, in the case that the air leak inspection is carried out at the oil seal shipping time, the bellows-like dust lip acts in the direction of being pressed to the outer peripheral surface of the tubular portion in the slinger on the basis of the pressure difference so as to seal the air flow. As a result, the air leakage is not sensed in the dust lip side as long as the oil seal is normal. Therefore, it is possible to carry out the simple inspection in which the threshold value of the air leakage is set to zero.

Further, the dust cover is provided together with the lip seal member and the slinger, the dust cover achieves the dust shake-off action on the basis of the centrifugal force at the shaft rotating time and the labyrinth seal action caused by forming the micro gap in relation to the lip seal member, and the dust lip achieves the seal action on the basis of the contact with the slinger. As a result, it is possible to inhibit the dust in the external side from entering into the machine.

Further, in the case that the contact surface pressure of the dust lip with the slinger is reduced by setting the projection in the inner peripheral surface of the second bellows portion, the dust lip further tends to move away from the slinger under the condition that the pressure in the space between the main lip and the dust lip is lowered. As a result, it is possible to further facilitate the inflow of the air (the atmospheric air pressure) in the external side.

DETAILED DESCRIPTION OF PREFERRED EMBODIMENTS

Next, a description will be given of embodiments according to the present invention with reference to the accompanying drawings.

Figure 1:
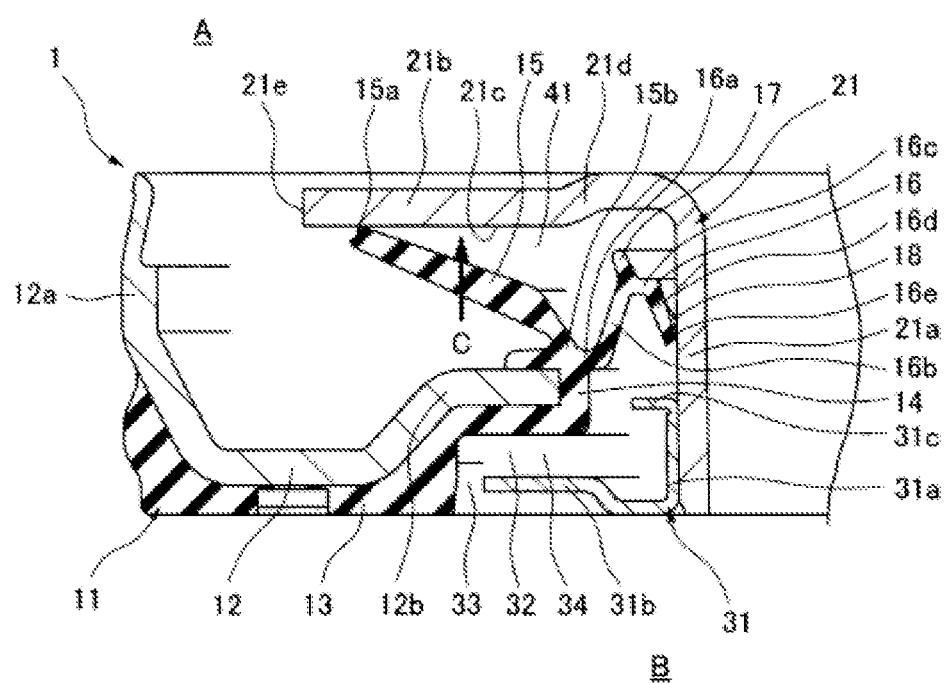
FIG. 1 is a cross sectional view of a substantial part of an oil seal according to an embodiment of the present invention.
Figure 2:
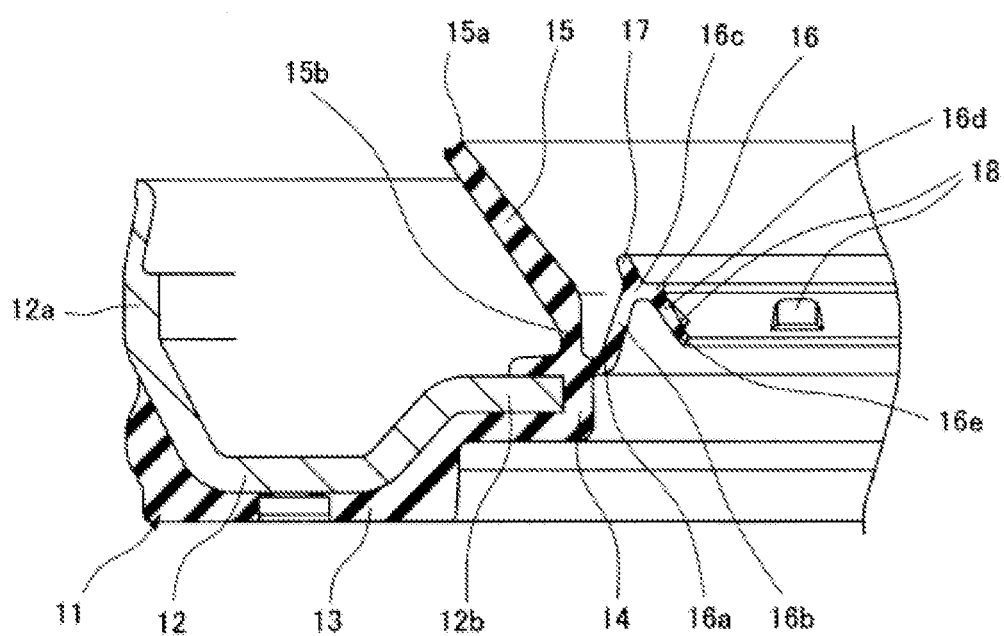
FIG. 2 is a cross sectional view of a substantial part and shows a state before a lip seal member in the oil seal is combined with a slinger.

FIG. 1 shows a cross section of a substantial part of an oil seal 1 according to an embodiment of the present invention, and FIG. 2 shows a state before a lip member 1 in the oil seal 1 is combined with a slinger 21.

The oil seal 1 shown in FIG. 1 is constructed by a combination of a lip seal member 11 which is fixed to an inner periphery of a shaft hole of a housing (not shown), and a slinger 21 which is fixed to a rotary shaft (not shown) inserted to the shaft hole, and inhibits a dust in an external side B from entering into a machine inner side A as well as inhibiting a sealed fluid in the machine inner side A from leaking to the external side B. Further, a dust cover 31 is combined together with the lip seal member 11 and the slinger 21.

Figure 3:
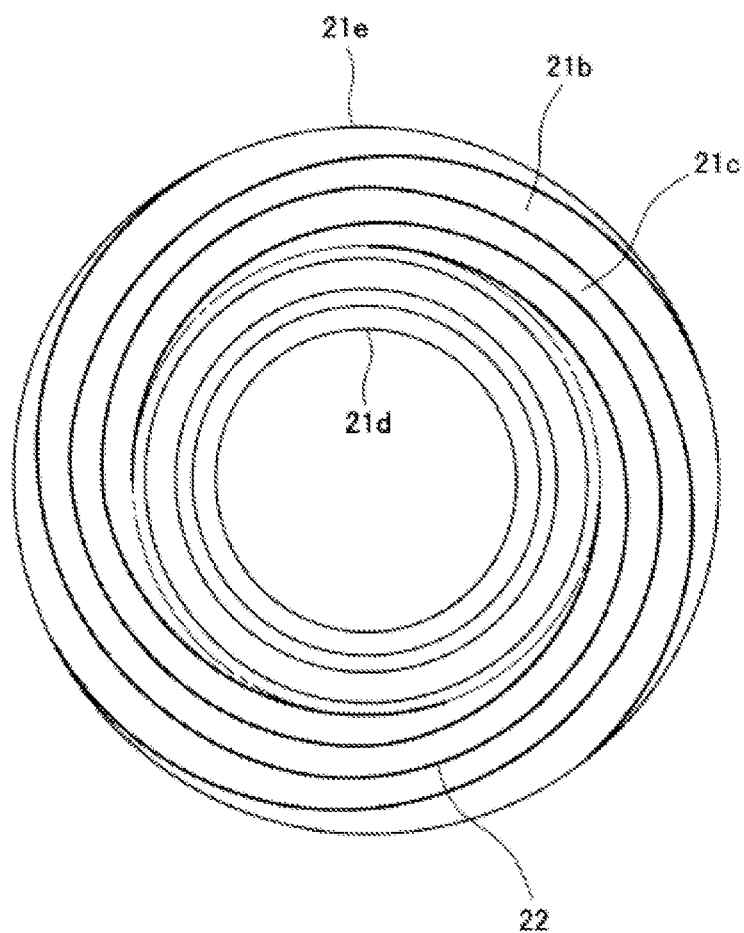
FIG. 3 is a view as seen from an arrow C in FIG. 1 and is an explanatory view of a thread groove in the oil seal.

The slinger 21 is constructed by a metal member, is obtained by integrally forming a flange portion 21b toward an outer side in a diametrical direction in a machine inner side end portion of a tubular portion 21a which is fitted to an outer peripheral surface of the rotary shaft, and is provided in an end surface 21c in the external side of the flange portion 21b with a thread groove 22 (refer to FIG. 3) which carries out a pumping action toward the outer side in the diametrical direction. As shown in FIG. 3, the thread groove 22 is constructed by a right-hand four-threaded screw, that is, formed into a four-equally arranged groove which goes from an inner side (an inner diameter side) to an outer side (an outer diameter side) clockwise, and the thread groove 22 is provided in a range from a flection portion 21d to a leading end portion 21e in a flange portion 21b.

The lip seal member 11 is provided with an attachment ring 12, and a rubber-like elastic body 13 which is attached to the attachment ring 12. The attachment ring 12 is constructed by a metal member, and is obtained by integrally forming the flange portion 12b toward an inner side in a diametrical direction in an external side end portion of a tubular portion 12 which is fitted to an inner peripheral surface of a shaft hole of the housing. The rubber-like elastic body 13 is integrally provided with an attached rubber portion 14 which is attached to the attachment ring 12, a main lip (a side lip) 15 which slidably comes into close contact with the external side end surface 21c of the flange portion 21b in the slinger 21 while being supported to the attached rubber portion 14 so as to seal a sealed fluid, and a dust lip (a bellows-like radial lip) 16 which is arranged in a machine inner side of the dust cover 31 in the external side of the main lip 15 while being supported to the attached rubber portion 14 in the same manner and slidably comes into close contact with an outer peripheral surface of the tubular portion 21a in the slinger 21 so as to suppress intrusion of a dust.

Among them, the main lip 15 is provided with a lip end 15a in the machine inner side and diagonally toward an outer side in a diametrical direction, and slidably comes into close contact with the external side end surface 21c of the flange portion 21b in the slinger 21 with the lip end 15a.

The dust lip 16 is integrally provided with a base end portion 16a which is arranged in an inner peripheral side of a base end portion 15b of the main lip 15, a first bellows portion (an outer peripheral side bellows portion) 16*b* which is diagonally provided toward an inner side in a diametrical direction and a machine inner side from the base end portion 16*a*, a reverse portion 16*c* which is provided in a leading end of the first bellows portion 16*b*, a second bellows portion (an inner peripheral side bellows portion) 16*d* which is diagonally provided toward an inner side in a diametrical direction and an external side from the reverse portion 16*c*, and a lip end 16*e* which is provided in a leading end of the second bellows portion 16*d* so as to be formed into a v-like bellows shape (a thin curved shape) in a cross section as a whole, and slidably comes into close contact with an outer peripheral surface of the tubular portion 21*a* in the slinger 21 with the lip end 16*e*.

The first bellows portion 16*b* is formed into a taper surface (a conical surface) shape in which a diameter is reduced little by little from the external side toward the machine inner side on the basis of the structure mentioned above. Further, the first bellows portion 16*b* is exposed to the atmospheric air pressure in the external side B with its inner peripheral surface and is also exposed to the pressure (the internal pressure) of the space 41 between the dust lip 16 and the main lip 15 with its outer peripheral surface.

The second bellows portion 16*d* is formed into a taper surface (a conical surface) shape in which a diameter is reduced little by little from the machine inner side toward the external side on the basis of the structure mentioned above. Further, the second bellows portion 16*d* is exposed to the atmospheric air pressure in the external side B with its outer peripheral surface and is also exposed to the pressure (the internal pressure) of the space 45 between the dust lip 16 and the main lip 15 with its inner peripheral surface.

Comparing the first bellows portion 16*b* with the second bellows portion 16*d*, the first bellows portion 16*b* is greater in its diameter and is longer in its bellows length. As a result, the pressure receiving area is set greater in the first bellows portion 16*b* than in the second bellows portion 16*d*.

The reverse portion 16*c* is provided with an annular visor shaped convex portion 17 toward the machine inner side.

Further, circumferentially partial projections (ribs) 18 are provided in an inner peripheral surface of the second bellows portion 16*d* (for example, three projections are uniformly arranged two by two). The projection 18 is structured such as to slidably come into contact with the outer peripheral surface of the tubular portion 21*a* in the slinger 21. Since the projection 18 is interposed as a spacer between an outer peripheral surface of the tubular portion 21*a* in the slinger 21 and an inner peripheral surface of the second bellows portion 16*d*, a contact surface pressure of the lip end 16*e* of the dust lip 16 in relation to the outer peripheral surface of the tubular portion 21*a* in the slinger 21 is reduced.

The dust cover 31 is constructed by a metal member, and is obtained by integrally forming an annular diametrical portion 31*b* toward an outer side in a diametrical direction in the external side end portion of a cylinder portion 31*a* which is fitted to the outer peripheral surface of the tubular portion 21*a* in the slinger 21. The diametrical portion 31*b* achieves a dust shake-off action on the basis of a centrifugal force at the shaft rotating time, that is, achieves a dust shake-off action which sends the dust attached to a surface of the diametrical portion 31*b* flying on the basis of the centrifugal force at the shaft rotating time. Further, the diametrical portion 31*b* faces to the rubber-like elastic body 13 of the lip seal member 11 and forms a micro gap 32 in relation to the rubber-like elastic body 13, thereby achieving a labyrinth seal action which makes the dust in the external side B hard to enter. The micro gap 32 is constructed by a combination of a diametrical gap 33 which is provided in an outer peripheral side of the diametrical portion 31*b*, and an axial gap 34 which is provided in the machine inner side of the diametrical portion 31*b*, and is formed into an L-shaped cross section as a whole. Further, an annular diametrical portion 31*c* is integrally formed in the machine inner side end portion of the cylinder portion 31*a* toward the outer side in the diametrical direction.

The oil seal 1 having the structure mentioned above is used, for example, sealing around a shaft of a crank shaft in an automotive engine, and inhibits the dust in the external side B from entering into the machine inner side A as well as inhibiting the sealed fluid (the oil) in the machine inner side A from leaking to the external side B as mentioned above. Since the oil seal 1 is provided with the structure mentioned above, the following actions and effects can be achieved.

More specifically, in the oil seal 1 having the structure mentioned above, since the dust lip 16 is constructed by the rubber-like elastic body in place of the fabric, and the dust lip 16 constructed by the rubber-like elastic body can be formed thin and tends to elastically deform, the tense force can be reduced in spite of the same fastening margin as the fabric. Further, since the dust lip 16 is integrally provided with the base end portion 16*a*, the first bellows portion 16*b*, the reverse portion 16*c*, the second bellows portion 16 and the lip end 16*e* so as to be formed into the bellows shape which extends and contracts in the diametrical direction as a whole, the tense force can be widely reduced. Therefore, it is possible to reduce the sliding torque of the dust lip 16 on the basis of the above matters.

Further, in the oil seal 1 having the structure mentioned above, the same effect as the advantage caused by the air intake of the fabric can be achieved as follows.

More specifically, in the oil seal having the structure mentioned above, since the thread groove 22 carrying out the pumping action toward the outer side in the diametrical direction is provided in the external side end surface 21*c* of the flange portion 21*b* in the slinger 21, an excellent seal effect is achieved in relation to the sealed fluid in the machine inner side A. However, in the case that the thread groove 22 mentioned above is provided, the pressure in the space 41 between the main lip 15 and the dust lip 16 tends to be lowered and the negative pressure tends to be generated in connection with the pumping action of the thread groove 22 at the shaft rotating time, so that the main lip 15 tends to come into entire contact with the slinger 21.

On the contrary, in the oil seal 1 having the structure mentioned above, the dust lip 16 is integrally provided with the base end portion 16*a*, the first bellows portion 16*b*, the reverse portion 16*c*, the second bellows portion 16*d* and the lip end 16*e* so as to be formed into the bellows shape which extends and contracts in the diametrical direction as a whole, as described above, and the pressure receiving area is set greater in the first bellows portion 16*b* than in the second bellows portion 16*d*. As a result, in the case that the pressure in the space 41 between the main lip 15 and the dust lip 16 is lowered, the atmospheric air pressure becomes relatively higher, and the dust lip 16 elastically deforms toward the outer side in the diametrical direction as a whole on the basis of the pressure difference, so that the lip end 16*e* is separated from the outer peripheral surface of the tubular portion 21*a* in the slinger 21 (the second bellows portion 16*d* and the lip end 16*e* are pressed to the inner side in the diametrical direction by the atmospheric air pressure and are going to displace in the same direction, however, since the lift amount toward the outer side in the diametrical direction by the second bellows portion 16b goes beyond it, the dust lip 16 displaces toward the outer side in the diametrical direction as a whole, so that the lip end 16e is separated from the outer peripheral surface of the tubular portion 21a in the slinger 21). Therefore, a clearance is tentatively formed between the lip end 16e and the tubular portion 21a, and the air (the atmospheric air pressure) in the external side B flows into the space 41 between the main lip 15 and the dust lip 16 via the clearance. As a result, it is possible to inhibit the pressure in the space 41 between the main lip 15 and the dust lip 16 from being extremely lowered and inhibit the negative pressure from being generated. Therefore, it is possible to inhibit the main lip 15 from coming into entire contact with the slinger 21.

Further, in the oil seal 1 having the structure mentioned above, the circumferentially partial projections 18 are provided in the inner peripheral surface of the second bellows portion 16d and the contact surface pressure of the dust lip 16 with the slinger 21 is reduced. Therefore, the dust lip 16 tends to be separated from the slinger 21. As a result, the inflow of the air (the atmospheric air pressure) in the external side B is further facilitated. The projection 18 also has an effect of improving a following capacity of the dust lip 16 in relation to eccentric of the shaft.

Further, in the oil seal 1 having the structure mentioned above, the disadvantage caused by the air discharge of the fabric is dissolved as follows.

More specifically, in the oil seal 1 having the structure mentioned above, since the thread groove 22 carrying out the pumping action toward the outer side in the diametrical direction is provided in the external side end surface 21c of the flange portion 21b in the slinger 21 as mentioned above, the excellent seal effect is applied to the sealed fluid in the machine inner side A. However, in the case that the thread groove 22 mentioned above is provided, the air flow passage is formed through the thread groove 22. Therefore, in the case that the air leak inspection is carried out at the shipping time of the oil seal 1, the air flowing in the air flow passage is sensed as the leakage.

On the contrary, in the oil seal 1 having the structure mentioned above, the dust lip 16 is integrally provided with the base end portion 16a, the first bellows portion 16b, the reverse portion 16c, the second bellows portion 16d and the lip end 16e so as to be formed into the bellows shape which extends and contracts in the diametrical direction as a whole, as described above, and the pressure receiving area is set greater in the first bellows portion 16b than in the second bellows portion 16d. As a result, in the case that the pressure in the space 41 between the main lip 15 and the dust lip 16 rises, the atmospheric air pressure becomes relatively lower, and the dust lip 16 elastically deforms toward the inner side in the diametrical direction as a whole on the basis of the pressure difference, so that the lip end 16e is strongly pressed to the outer peripheral surface of the tubular portion 21a in the slinger 21 and is hard to be separated from the tubular portion 21a. Therefore, since the dust lip 16 seals the pressure (the air flow) in the space 41 between the main lip 15 and the dust lip 16, the air leakage is not sensed in the dust lip 16 side in the case that the oil seal 1 is normal. As a result, it is possible to carry out a simple inspection in which a threshold value of the air leakage is set to zero.

Further, an original function of the dust lip 16 is to inhibit the dust in the external side B from entering into the machine inner side A, however, the oil seal 1 having the structure mentioned above seals the dust as follows.

More specifically, in the oil seal 1 having the structure mentioned above, the dust cover 16 is provided together with the lip seal member 11 and the slinger 21, and the diametrical portion 16b of the dust cover 16 achieves the dust shake-off action on the basis of the centrifugal force at the shaft rotating time and the labyrinth seal action obtained by forming the micro gap 32 in relation to the seal member 11. Therefore, the dust can be sealed by these actions. Further, since the dust lip is in a state in which the lip end 16e is in contact with the outer peripheral surface of the tubular portion 21a in the slinger 21, at the stationary time, it is possible to seal the dust on the basis of the seal action of the dust lip 16.

With regard to the dust cover 16, it can be thought that the labyrinth seal action is enlarged by changing its cross sectional shape and increasing the facing area in relation to the lip seal member 11 so as to elongate the flow passage length of the micro gap 32.

Figure 4:
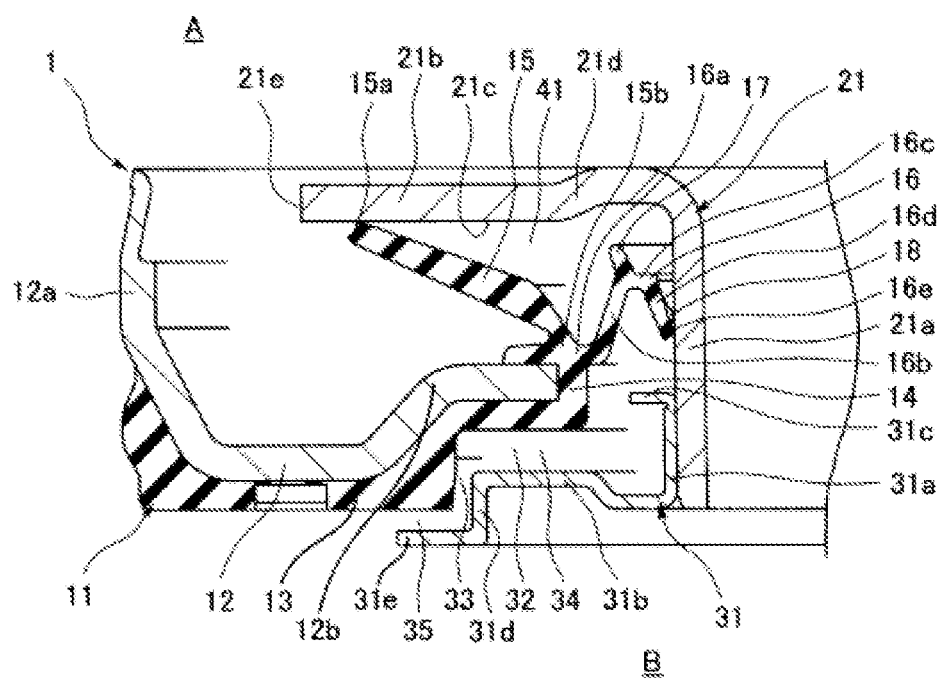
FIG. 4 is a cross sectional view of a substantial part of an oil seal according to the other embodiment of the present invention.
Figure 5:
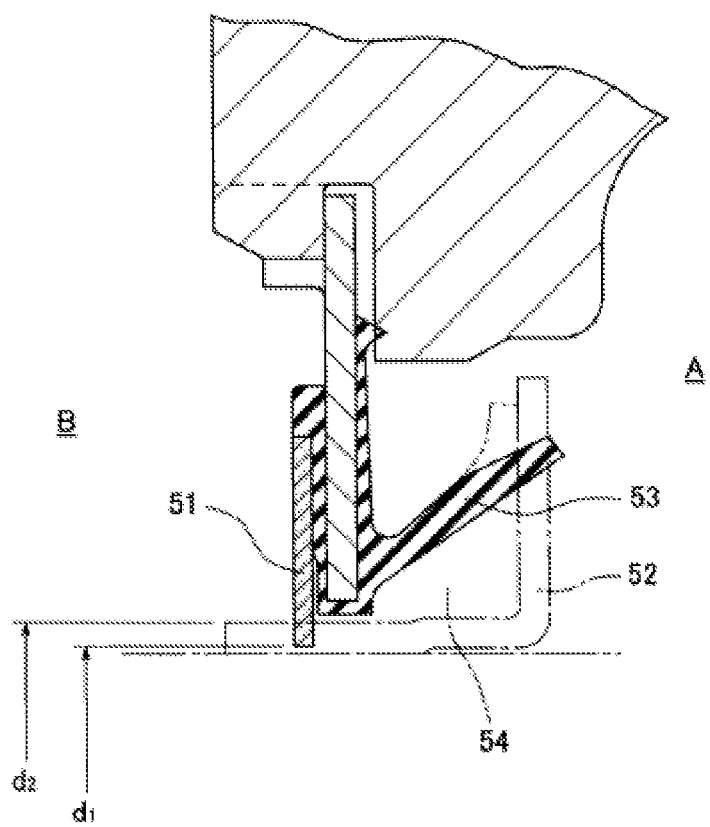
FIG. 5 is a cross sectional view of a substantial part of an oil seal according to a prior art.

In this regard, in the other embodiment shown in FIG. 4, the dust cover 16 is structured such as to be integrally provided with a cylinder portion (a first cylinder portion) 31a which is fitted to the outer peripheral surface of the tubular portion 21a in the slinger 21, a diametrical portion (a first diametrical portion) 31b which is provided toward the outer side in the diametrical direction from an external side end portion of the cylinder portion 31a and a diametrical portion (a second diametrical portion) 31c which is provided toward the outer side in the diametrical direction from a machine inner side end portion of the cylinder portion 31a, and is additionally provided integrally with a diametrical portion (a second diametrical portion) 31d which is provided toward the external side from an outer peripheral end portion of the diametrical portion 31b and a diametrical portion (a third diametrical portion) 31e which is provided toward the outer side in the diametrical direction from an external side end portion of the cylinder portion 31d, and the micro gap 32 is constructed by a combination of an axial gap 35 (which is provided in the machine inner side of the diametrical portion 31e, a diametrical gap 33 which is provided in the outer peripheral side of the cylinder portion 31d and an axial gap 34 which is provided in the machine inner side of the diametrical portion 31b. The other structures of the oil seal 1 in FIG. 4 are set to the same as those of the oil seal 1 in FIG. 1.

Further, in the oil seal 1 in FIG. 1, the dust lip 16 elastically deforms toward the outer side in the diametrical direction as a whole on the basis of the atmospheric air pressure which becomes relatively higher under the condition that the pressure in the space 41 between the main lip 15 and the dust lip 16 is lowered, and the lip end 16e is separated from the outer peripheral surface of the tubular portion 21a in the slinger 21. However, this is applied to the case that the rigidity of the dust lip 16 formed into the V-shaped bellows cross section is somewhat high, whereby the dust lip 16 is hard to elastically deform (the opening angle of the V-shape is hard to change). On the contrary, in the case that the rigidity of the dust lip 16 formed into the V-shaped bellows cross section is low, the second bellows portion 16d of the dust lip 16 is pressed to the outer peripheral surface of the tubular portion 21a in the slinger 21 on the basis of the atmospheric air pressure which becomes relatively higher under the condition that the pressure in the space 41 between the main lip 15 and the dust lip 16 is lowered. At this time, the circumferentially partial projections (ribs) 18 provided in the inner peripheral surface of the second bellows portion 16d (for example, three projections uniformly arranged two by two) act as a supporting point of a lever and act as a point of application of the lever. As a result, the lip end 16e is separated from the outer peripheral surface of the tubular portion 21a in the slinger 21. Therefore, even according to the action based on the principle of leverage caused by the provision of the projections (the ribs) 18 in the inner peripheral surface of the second bellows portion 16d as mentioned above, the air (the atmospheric air pressure) in the external side B can be flowed into the space 41 under the condition that the pressure in the space 41 between the main lip 15 and the dust lip 16 is lowered. Since the projections (the ribs) 18 are circumferentially provided two by two, the projections are hard to be laterally shaky circumferentially. As a result, there is an effect of easily lifting up the lip end 16e on the basis of the principle of leverage.

What is claimed is:

1. An oil seal for a rotary shaft that is inserted into a shaft hole of a housing having an external side and a machine inner side, the oil seal comprising:
    a lip seal member that is fixed to an inner periphery of the shaft hole of the housing;
    a slinger which is fixed to the rotary shaft, the slinger being integrally provided with a tubular portion that is fitted to the rotary shaft and a flange portion that extends toward an outer side in a diametrical direction from the tubular portion, the slinger inhibiting dust on the external side from entering into the machine inner side, and the slinger inhibiting a sealed fluid in the machine inner side from leaking to the external side, and the slinger being provided with a threaded groove that is configured to generate a pumping action toward the outer side in the diametrical direction on an end surface of an external side of the flange portion; and
    a dust cover integrally provided with a cylinder portion that is attached to the tubular portion of the slinger, and provided with a diametrical portion that extends toward the outer side in the diametrical direction from the cylinder portion, the diametrical portion having an angled portion
    wherein, during rotation of the shaft, the angled portion of the diametrical portion of the dust cover is configured to achieve a dust shake-off action that is generated by a centrifugal force that is generated during rotation of the shaft;
    the diametrical portion is spaced apart from the lip seal member by a micro gap such that, during rotation of the shaft, a labyrinth seal is generated,
    the lip seal member is provided with a main lip that slidably contacts the end surface on the external side of the flange portion of the slinger to seal the sealed fluid, and a dust lip that slidably contacts an outer peripheral surface of the tubular portion of the slinger to suppress intrusion of the dust, the dust lip being arranged between the main lip and the dust cover, and
    the dust lip is formed of an elastic body that is a concave lip facing the external side and integrally provided with a first bellows portion that receives an internal pressure between the dust lip and the main lip on an outer peripheral surface thereof, and receives an atmospheric air pressure from the external side on an inner peripheral surface thereof, a second bellows portion that receives the internal pressure between the dust lip and the main lip on an inner peripheral surface thereof and receives the atmospheric air pressure from the external side on an outer peripheral surface thereof, and a lip end that slidably contacts the outer peripheral surface of the tubular portion of the slinger, and a pressure receiving area that is greater on the first bellows portion than on the second bellows portion, the first bellows portion being a first conical portion that is axially longer than the second bellows portion that is a second conical portion.

2. The oil seal according to claim 1, wherein the dust lip is provided on the inner peripheral surface of the second bellows portion with a circumferentially partial projection which comes into contact with the outer peripheral surface of the tubular portion of the slinger, and is provided with a structure in which the projection is interposed between the outer peripheral surface of the tubular portion of the slinger and the inner peripheral surface of the second bellows portion, thereby reducing a contact surface pressure of the lip end of the dust lip in relation to the outer peripheral surface of the tubular portion of the slinger.

* * * * *